May 15, 1934.   L. F. SIMPSON   1,958,499
MILK BOTTLE
Filed April 16, 1931
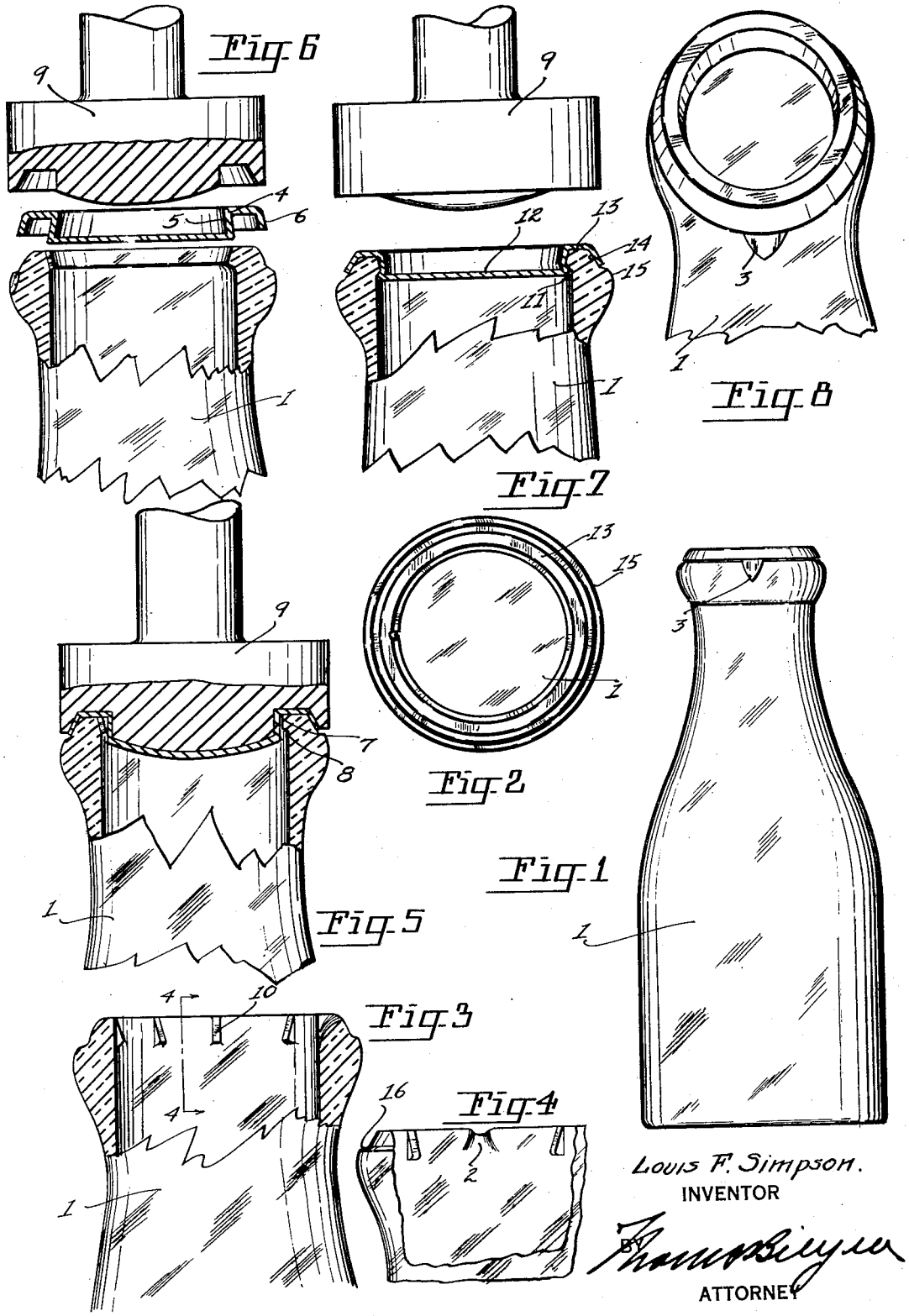
Louis F. Simpson.
INVENTOR
ATTORNEY Patented May 15, 1934

1,958,499

UNITED STATES PATENT OFFICE 1,958,499

MILK BOTTLE

Louis F. Simpson, Portland, Oreg.

Application April 16, 1931, Serial No. 530,702

1 Claim. (Cl. 215—31)

My invention is primarily intended as a bottle for milk and relates to improvements in caps for milk bottles, filed concurrently herewith.

The invention consists primarily of a milk bottle formed with an outwardly extending lip near the top end thereof. A ledge is formed upon the outer rim of the bottle neck immediately below the top thereof. A flattened surface terminates the upper end of the bottle. A pouring lip is disposed at one side of the open end of the bottle. A recess is disposed at one side of the bottle neck to facilitate the removal of the cap from the bottle by the insertion of a removing instrument therebehind.

The primary purpose of the two inventions is to provide a milk bottle and cap that will enable the distributor of milk to deliver the milk in a highly sanitary and satisfactory condition to the ultimate consumer, by reasons of the protective covering to the pouring surfaces of the bottle afforded by my new and improved cap.

A further object of my invention consists in providing a milk bottle to which a cap may be attached and so made that the cap will be hermetically sealed to the bottle on the inside by expansion to thereby prevent the premature removal of the cap from the bottle.

A still further object of my invention consists in providing a milk bottle that has a pouring lip formed integral therewith, to prevent a drip that normally occurs in the pouring of milk from bottles.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing:

Fig. 1 is a side view of a milk bottle, illustrating a cap in place and a recess disposed therebelow, to facilitate the removal of the cap from the bottle.

Fig. 2 is a top, plan view of Fig. 1.

Fig. 3 is a fragmentary, sectional, side view of a modified form of the bottle neck.

Fig. 4 is a fragmentary, sectional, side view of Figure 3 taken along the line 4—4 in Figure 3.

Fig. 5 is a fragmentary, sectional, side view of the bottle neck, illustrating the placement of the cap thereupon by a suitable die provided for that purpose.

Fig. 6 is a fragmentary, sectional, side view of the bottle, a cross sectional view of the cap and a fragmentary, sectional, side view of the die, illustrating the die in position for forcing the cap upon and within the upper end of the bottle.

Fig. 7 is a fragmentary, sectional, side view of the bottle neck illustrating in sectional, side view, the cap in place within the bottle and showing the cap in placement and locked relative to the bottle neck.

Fig. 8 is a perspective, top, plan view of a cap and bottle neck illustrating the recess formed within the bottle, which facilitates the removal of the cap from the bottle.

Like reference characters refer to like parts throughout the several views.

Reference numeral 1 indicates a milk bottle formed with a pouring spout 2 upon the inner surface of the upper end of the bottle. The pouring spout comprises a sloping surface extending from the top of the bottle and terminates in a relatively sharp lip edge at its outer point to prevent drip following down the outside of the bottle.

A recess 3 is also provided at the top edge of the bottle and is positioned below the normal distance that the cap follows theredown. The recess is provided in order that a removing instrument may be placed under the cap, to initially start, and to facilitate the removal of the cap from the bottle. The cap for bottles of this kind primarily comprises a single piece 4 having, when in place, an inner wall 5 and an outer lip 6, to completely protect the upper end of the bottle when the cap is in place upon the bottle. An inwardly extending ledge 7 comprises the inner, upper, surface of the bottle neck to form an annular recess 8, immediately therebelow and an annular sloping surface 11A is disposed therebetween.

The cap is forced in position into the bottle, through the use of any suitable means, as through the use of a die 9. The cap being made of a material having inherent qualities that will permit the cap to be forced into the recess 8, disposed adjacent the ledge 7 of the upper, inner surface of the bottle neck. The ledge 7 may run entirely around the inner, upper surface of the bottle. Inwardly projecting lugs 10 may be disposed upon the inner, upper surface of the bottle neck to engage on their underside, that portion of the cap 11, illustrated in Fig. 7, which will occupy the position, as illustrated in Fig. 7, after the die has been removed, which forces the cap into place and position.

The upper surface 13 of the bottle lies in a single plane and the outer surface 14 of the bottle adjacent the upper end is uniformly inclined outwardly to facilitate snugly engaging the lip 6 of the cap with the uppermost end of the bottom. A rim 15 is disposed below the normal edge of the lip 14, to give the bottle added strength and stability. The sloping surface 16, as illustrated in Fig. 4, of the bottle is immediately adjacent the lower edge of the ledge 14.

While the form of mechanism herein shown and described, is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

A milk bottle having an upstanding rim at the mouth thereof, the interior surface of which rim is inclined downwardly and inwardly to form, with the subjacent portion of the neck, an undercut recess for the reception and retention of a closure member; said interior surface having a pouring spout formed therein; said rim having a downwardly and outwardly sloping exterior surface and an annular outstanding bead therebelow, said exterior surface and bead being joined to form an annular shoulder.

LOUIS F. SIMPSON.